United States Patent [19]
Stout

[11] 4,316,084
[45] Feb. 16, 1982

[54] LIGHT TRACKING DETECTORS AND HOUSING THEREFOR

[76] Inventor: Alton H. Stout, 9730 S. Sheridan Rd., Fenwick, Mich. 48834

[21] Appl. No.: 104,268

[22] Filed: Dec. 17, 1979

[51] Int. Cl.³ .............................................. G01J 1/20
[52] U.S. Cl. .................................. 250/203 R; 126/425
[58] Field of Search ........................... 250/203 R, 209; 126/424, 425; 356/141, 152

[56] References Cited

U.S. PATENT DOCUMENTS

| 4,041,307 | 8/1977 | Napoli et al. | 250/203 R |
| 4,179,612 | 12/1979 | Smith | 250/203 R |
| 4,225,781 | 9/1980 | Hammons | 250/203 R |

Primary Examiner—David C. Nelms
Assistant Examiner—Edward P. Westin
Attorney, Agent, or Firm—Price, Heneveld, Huizenga & Cooper

[57] ABSTRACT

A light tracking sensor for mounting on, for example, a solar collector; provides control signals which are employed with a drive mechanism for a tracking device to direct the collector toward the sun. The sensor includes a mounting base with a plurality of first light detectors mounted in spaced relationship on the base for receiving incident sunlight. An adjustable shade is mounted to the base for selectively shading light directed toward the detectors and a target is positioned on the base between the light detectors and includes elongated recesses each with a recessed additional light detector. The first light detectors initiate operation of the light tracking device in a direction to orient the target toward the light source and the recessed light detectors terminate operation of the light tracking device once the target is directed toward the light source.

14 Claims, 5 Drawing Figures

LIGHT TRACKING DETECTORS AND HOUSING THEREFOR

BACKGROUND OF THE INVENTION

The present invention relates to light sensors and particularly sensors used in light tracking devices.

With the current shortage and cost of fossil fuels, there is an increase in interest in alternative energy sources including solar energy. It is well known that for solar collectors to be efficiently used for energy transfer, it is necessary to direct the solar collector toward the sun as it moves through its daily arc of travel. This naturally maximizes the amount of radiant energy absorbed by the collector permitting most efficient utilization of the radiant energy from the sun.

There have been several relatively complicated solar tracking devices proposed, some of which employ light sensing devices permitting the tracking of the sun and some of which simply are motorized on a time basis to scan the arc of travel of the sun through the sky each day. Representative of existing solar tracking devices are U.S. Pat. Nos. 4,151,408; 4,158,356; 4,159,710; and 4,091,799. For the most part the prior art either incorporates a specialized solar tracking device integrated with the collector configuration and therefore not usable for a variety of different collectors or they have been relatively complicated and therefore costly.

There exists a need therefore for a relatively inexpensive sensor which can be used for providing signals controlling a solar tracking device for a solar collector.

SUMMARY OF THE PRESENT INVENTION

The system of the present invention satisfies this need by providing a sensor including a mounting base with a plurality of light detectors mounted in spaced relationship on the base. Target means are positioned on the device between the detectors and includes at least one elongated recess formed downwardly therein and a recessed light detector. The first named detectors provide signals for initiating operation of a solar tracking device while light received by the recessed light detector serves to deactivate the solar tracking device once the target is directed toward the light source. In one embodiment an adjustable shade means is mounted to the base for shading light directed toward the plurality of detectors for varying the angle of incidence at which the detectors will respond to incident light.

The system of the present invention therefore provides a relatively uncomplicated light sensor which can be used in conjunction with a solar tracking device for directing the solar tracking device and associated solar collector toward the sun as it travels through an arc during the day and provides multiple axis movement for aligning with the sun not only during each day's travel but also as the sun's elevation varies during the year. These and other features, objects and advantages of the present invention will become apparent upon reading the following description thereof together with reference to the accompanying drawings in which:

DETAILED DESCRIPTION OF THE PREFERRED EMBODIMENT

Figure 1:
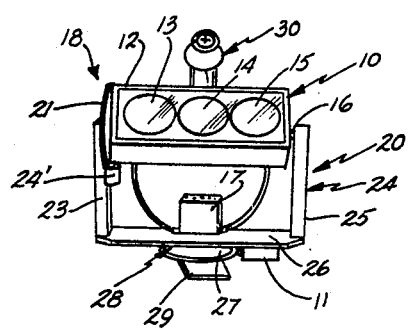
FIG. 1 is a front elevational view of a solar collector embodying the present invention.
Figure 2:
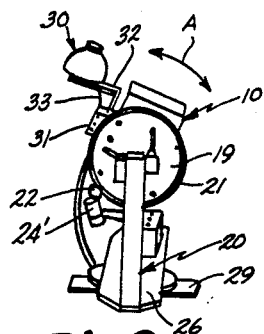
FIG. 2 is a left side elevational view of the structure shown in FIG. 1.

Referring initially to FIGS. 1 and 2, there is shown a solar collector 10 which is movably mounted to a tracking device 20 for positioning the solar collector in orientation facing the sun as the sun travels from horizon to horizon during the daytime. Sensing means 30 are mounted to the solar collector 10 for detecting the sun's position and for providing signals employed by the drive means for a tracking device 20 for maintaining the collector in alignment with the sun's rays.

Collector 10 comprises, in the preferred embodiment, an elongated rectangular box 12 having one side formed of three Frensel lenses 13, 14 and 15 focusing radiation from the sun onto a suitable heat exchanger (not shown) which can take the form of a water conduit when, for example, the solar collector 10 is employed for heating water. The solar collector itself forms no part of the present invention and the collector may be of any conventional nature either for heating water or for converting radiation directly into electricity through photoelectric cells or the like. The rectangular box 12 containing the heat exchanger and the lens system is rotatably mounted to the tracking device 20 by means of a pair of Tub-axles and bearings 16 on either end of the box permitting rotation of the collector with respect to base 24 in an arc (indicated by arrow A in FIG. 2) corresponding to an elevation adjustment.

Drive means 18 extending between collector 10 and tracking device 20 is mounted at the left end of the solar collector and comprises, as best seen in FIG. 2, a circular hub 19 having a solid rubber tire 21 at its peripheral edge which is engaged by a drive wheel 22 driven by a motor 24'. The base 24 is a U-shaped member including a first leg 23, a second upright leg 25 and a floor 26. Hub 19 is coupled to box 12 such that rotation of drive wheel 22 in first or second directions rotates the collector box either clockwise or counterclockwise thereby tilting the box in a direction to align with the angle of incidence of sunlight in the north-south direction. The tracking device 20 aligns the collector with the sun in an east-west direction by virtue of a second drive mechanism 28 substantially identical to the first drive mechanism and which includes a hub 27 and drive motor 11 with the hub 27 mounted to floor 26 and the drive motor mounted to a support platform 29 which, in turn, is secured to either the ground if the unit is positioned on the ground or the roof of a building or other suitable support. Power for the drive motors is provided by a battery 17 electrically coupled to the motors in a manner shown and described in conjunction with FIG. 5 below. Thus, the tracking device provides east-west and north-south tracking of the sun for the solar collector 10.

Figure 4:
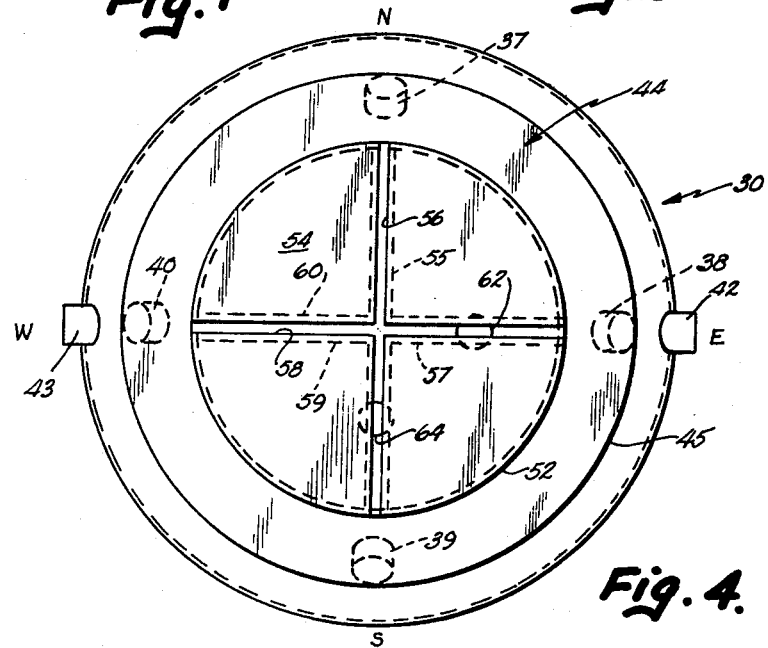
FIG. 4 is a top plan view of the sensor shown in FIG. 3.
Figure 5:
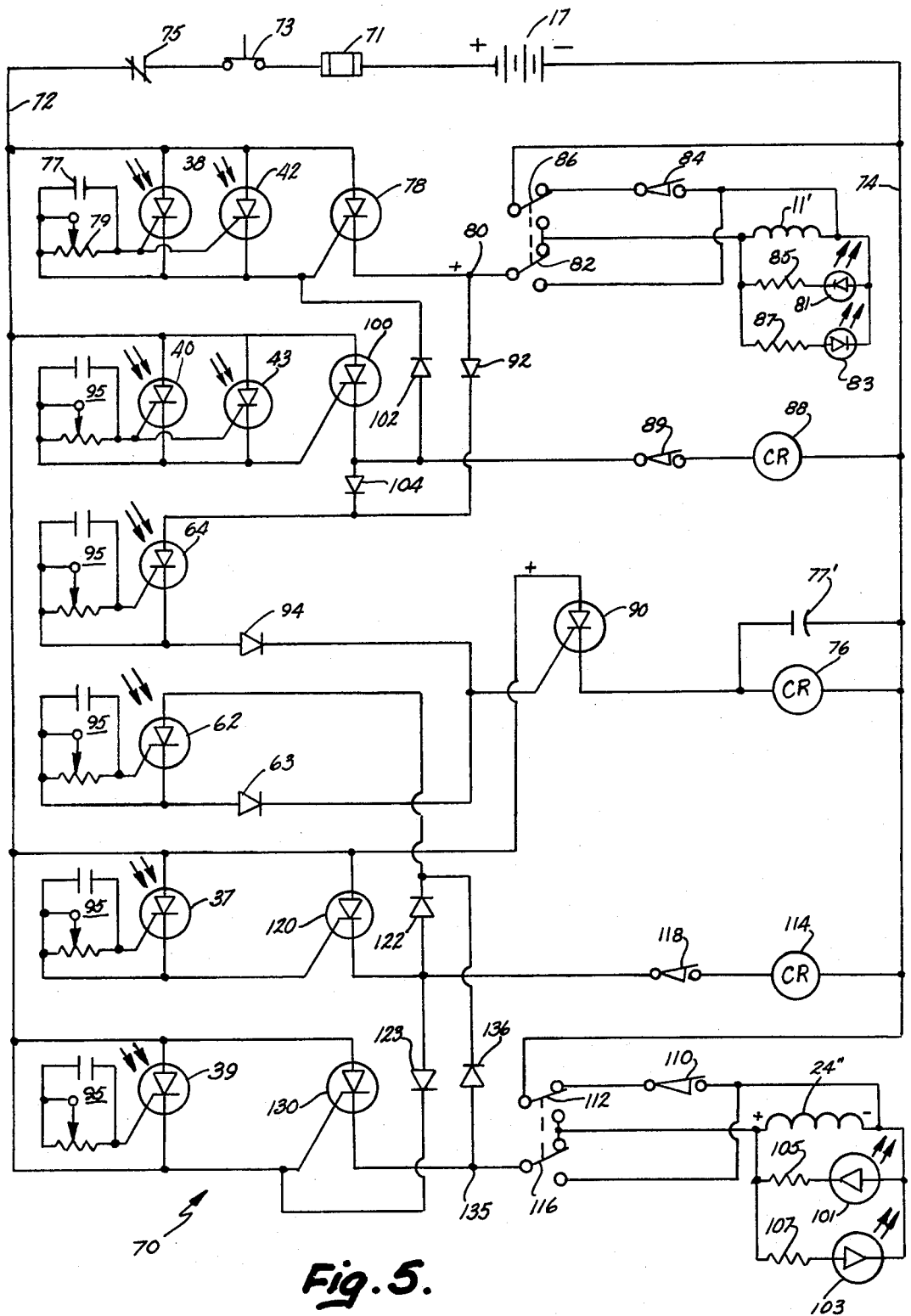
FIG. 5 is an electrical circuit diagram in schematic form of a control system employed in connection with the sensor shown in FIGS. 3 and 4 and the solar collector shown in FIGS. 1 and 2.

The sensing means 30 is mounted to the collector 10 by means of an angle bracket 32 extending from a control box 31 which is mounted to the rear wall of box 12 in a conventional fashion. The control circuit 70 shown in FIG. 5, is housed within control box 31 and a multiconductor cable 33 couples the various detectors contained in the sensor 30 to the control circuit of FIG. 5. The sensing means 30 is now described in greater detail with reference to FIGS. 3 and 4.

Figure 3:
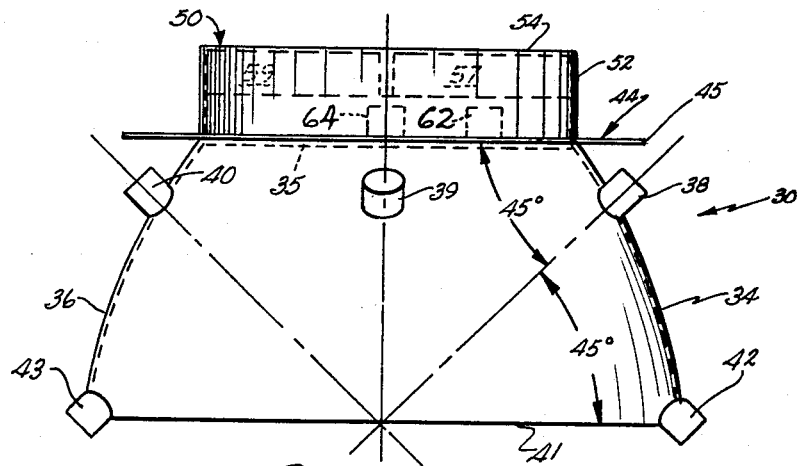
FIG. 3 is a greatly enlarged front elevational view of a sensor embodying the present invention and shown in FIGS. 1 and 2.

Sensor 30 comprises a mounting base 34 which, as best seen in FIG. 3, comprises an inverted bowl-shaped member having a flat floor 35 and a curvilinear concave sidewall 36. Base 34 includes a plurality of angularly-spaced first light detectors 37, 38, 39 and 40 positioned, as best seen in FIG. 4, at 90° with respect to one another at locations corresponding to north, east, south and west reference locations respectively. Thus, detectors 38 through 40 are positioned in an angular relationship of 90° with respect to one another around the periphery of the mounting base 34 near the top thereof such that as seen in FIG. 3 the axis of the light detectors fall in a conical locus of points and at an angle of 45° from the bottom edge 41 of the base at an angle of 45° to shade means 44. Also mounted to base 34 are a pair of back light detectors 42 and 43 which are positioned at the lower edge of the mounting base 34 pointing downwardly at 45° in the east and west directions.

Mounted to the floor 35 of mounting base 34 is a disc-shaped circular shade 44 which, in the preferred embodiment, is made of a thin sheet of aluminum and is relatively flexible such that the peripheral edge 45 adjacent the sensors 37 through 40 can be manually bent upwardly or downwardly as desired for controlling the light which impinges upon the light sensitive surfaces of the detectors. As will be described in greater detail below, light striking sensors 37 through 40 causes the actuation of the tracking device. Shade 44 defining an annular skirt surrounding floor 35 can be adjusted such that the sensor will periodically activate the tracking device at a frequency of approximately once every 8 to 11 minutes for realigning the solar collector 10 with the sun.

Positioned on top of shade 44 is target means 50 comprising a body having a cylindrical sidewall 52 and a circular top 54 with orthogonally extending slots or recesses 56 and 58 formed downwardly through floor 54. The slots or recesses 56 and 58 in the preferred embodiment extend between detector pairs 37, 39 and 38, 40 respectively in the north-south and east-west directions as best seen in FIG. 4. Secured to the undersurface of floor 54 are four L-shaped deflectors 55, 57, 59 and 60 which are secured to the undersurface of the floor 54 adjacent slots 56 and 58 to thus define elongated downwardly extending recesses which direct light onto a pair of recessed light detectors 62 and 64 which are mounted on the shade 44 under an aligned with the recesses 58 and 56. The detectors 62 and 64 are positioned along the east-west and north-south axes respectively of the device as shown in FIG. 4 approximately midway from the center of the target to its peripheral edge. The use of elongated recesses assure that once the target is aligned along one of the axes, it will remain stationary and the narrow slots provide precise alignment of the sensor when it moves orthogonally with respect to one of the recessed detectors since the recesses permit only a narrow beam of direct light to impinge upon the recessed detectors. As will be explained in greater detail below, detectors 37 through 40 initiate the operation of the tracking device while detectors 62 and 64 terminate the motion of the tracking device when the target is pointed directly at the sunlight and detector 62 and/or 64 receives light through the recesses 56 and/or 58 respectively.

In one embodiment of the invention, the target has a diameter of three and one-half inches with the recesses 56 and 58 having a width of approximately one-sixteenth of an inch, and extending the full diameter of the disc-shaped floor of the target 50. In such an embodiment, the sidewalls 52 of the target had a dimension of approximately one inch while the extension of the shade 44 beyond the edge of the target was approximately 0.8 inches thus defining an annular skirt between target and the mounting base for shading the light detectors. The target, shade and mounting base can be assembled in a conventional means such as by using suitable bonding adhesives or by fastening means such as screws or the like. In one embodiment of the invention, in place of the L-shaped deflectors 55, 57, 59 and 60, the interior volume of the target was filled with an opaque epoxy and recesses 56 and 58 then formed by sawing the slots downwardly through the floor of the target. Recesses for the cylindrical detectors 62 and 64 were drilled upwardly from the opposite side and then positioned as shown in FIGS. 3 and 4 before assembling the target to the shade and base. Naturally, the leads for the various detectors can be brought together and dressed within the interior space of the mounting base 34 and subsequently connected to the control circuit shown in FIG. 5 which is now described.

In FIG. 5 the light detectors and other circuit elements previously shown carry identical reference numerals used in the previous Figures. In FIG. 5, power from the DC battery 17 is applied to a positive voltage bus line 72 and to a negative voltage bus line 74 through fuse 71 serially coupled to the positive terminal of the battery and a power on/off switch 73. The terminal of switch 73 remote from fuse 71 is coupled to the positive supply bus 72 through a normally closed relay contact 75 associated with a relay coil 76. Thus, when coil 76 is nonactivated, contact 75 will be closed as shown. The negative terminal battery 17 is coupled directly to the negative supply bus 74.

Light detectors 38 and 42 associated with the easterly direction (as shown in FIGS. 3 and 4) comprise light activated SCR's (LASCR) which are commercially available and are coupled in parallel with their anode terminals coupled to bus 72 and their cathode terminals coupled to the gate terminal of a conventional SCR 78 having its anode also coupled to supply bus 72. The gate terminals of LASCR's 38 and 42 are coupled to a sensitivity control comprising a parallel capacitor 77 and variable resistor 79, the junction of which is coupled between the gate of LASCR's 38 and 42, and their cathode terminals. When light strikes either LASCR's 38 or 42 therefor, they will conduct to apply a positive going triggering signal to the gate of SCR 78 which, in turn, provides a positive supply voltage at its cathode which is coupled to terminal 80 and which provides operating power to the motor winding 11' through the current path including switch contact 82, limit switch 84, and switch contact 86 as shown in FIG. 5. It is noted here that motor winding 11' is associated with the motor 11 shown in FIG. 1. Contacts 82 and 86 are associated with a relay coil 88 which is shown in its unactivated state in FIG. 5. Thus, when current is applied to coil 88, switch contacts 82 and 86 will move to the downward position thereby reversing the polarity of voltage applied to motor coil 11' for reversing this motor which is associated with the east-west direction of motion of the tracking device 20. Light emitting diodes 81 and 83 are coupled in parallel across motor winding 11' through current limiting resistors 85 and 87 respectively indicating to the operator the activation of the motor winding in a westerly or easterly direction respectively. The circuit described thus far is employed for operating motor 11 to move the solar tracking device in a westerly arc thus, when either LASCR 38 or 42 is activated, the positive voltage applied at terminal 80 will supply current to motor 11 for this purpose.

Once the tracking device has moved to align the target with the sun, relay coil 76 is actuated by the actuation of SCR 90, in turn, activated by light impinging upon LASCR 64 to open contact 75 associated with relay coil 76 thereby disconnecting power supply 17 from the motor winding 11' causing the solar collector to stop its tracking movement once aligned with the sun. The current path for this operation is from terminal 80 through diode 92 to the anode of the LASCR 64, through LASCR 64 and through a diode 94 to the gate of SCR 90 which is triggered by the activation of LASCR 64. Once SCR 90 conducts, it couples the supply line 72 coupled to coil 76. A capacitor 77' assures coil 76 remains activated a time sufficient to maintain contact 75 open for a period of time long enough to deactivate the circuit. It is noted here that each of the gate circuits of each of the LASCR's includes a parallel resistive-capacitive sensitivity adjustment network which are indentified for purposes of simplicity as networks 95 since they are identical. Limit switch 84 is mechanically coupled between the platform 29 and base 26 of the tracking device (FIG. 1) to limit the scope of travel of the unit in an easterly direction. Similarly, a limit switch 89 is coupled in series with relay coil 88 to deactivate current to coil 88 preventing overtravel in a westerly direction.

When the unit moves from west to east, either LASCR 40 or 43 is activated by a light which triggers SCR 100 having its anode coupled to the supply bus 72 and its cathode coupled to coil 88 through normally closed limit switch 89. SCR 100 also supplies operating power to terminal 80 through diode 104 and supplies a positive signal to the gate of SCR 78 through diode 102 rendering it conductive such that LASCR 64 will receive operating power through diode 92. Diode 104 is also rendered conductive to apply operating power to the LASCR 64 in a parallel current path such that either SCR 78 or SCR 100 can apply operating power to LASCR 64. Thus, LASCR's 38 and 42 are operated to control the movement from east toward west of the tracking device by actuation of motor 11' in a first direction and which operation is terminated by the activation of LASCR 64 enabling coil 76 through SCR 90 to open contact 75 thereby disabling SCR 78. Similarly, LASCR's 40 and 43 are employed to activate motor 11 in a reverse direction through the activation of coil 88 to cause the tracking device to move from west to east with LASCR 64 being operative to disconnect power to the LASCR's 40 and 43 once the target is aligned with the sun by the activation of coil 76 to SCR 90 thereby opening contact 75 and disconnecting power to the circuit. One advantage of this circuit is that when the solar tracking device is in a standby condition (i.e. aligned with the sun), little or no power is consumed by the system. It is noted here that contact 76 is only momentarily activated as the capacitor 77 discharges thereby only momentarily opening contact 75 to quench the operation of the LASCR's and associated controlled SCR's.

As can be seen, the control circuitry for the north-south direction is substantially identical to that for the previously described east-west direction. Thus, the LASCR's 37 and 39 positioned in the north and south directions on the sensor respectively are employed for moving the tracking device in a southerly or northerly direction respectively. They accomplish this by providing operating power for motor coil 24" associated with motor 24' shown in FIG. 2 for elevating the solar collector 10 either upwardly or downwardly toward the angle incidence of the sun. Motor winding 24" receives operating power through a northern direction limit switch 110 coupled to one terminal of the winding having its remaining terminal coupled to the negative bus supply line 74 through switch contact 112 associated with a north-south control relay 114. The positive side of coil 24" is coupled to the positive bus supply conductor 72 through contacts 116, and either SCR 120 or SCR 130 associated with LASCR 37 or LASCR 39 respectively. A south limit switch 118 is coupled serially with coil 114 associated with contacts 112 and 116 to disconnect operating power therefrom in the event the tracking device travels too far in a southerly direction.

Thus, for example, if the target is pointed to the north of the sun and thereby light is received by LASCR 39, it is activated to provide a trigger for SCR 130 which, in turn, provides operating power to a terminal 135. The plus supply is thus connected through relay contact 116 to winding 24" causing the motor to move the tracking device in a southerly direction. The plus supply voltage is also applied through diode 136 to the anode of LASCR 62 mounted to the target as shown in FIGS. 3 and 4 which receive light once the target is oriented toward the sun in a north-south direction. Once LASCR 62 is rendered conductive, it applies a positive voltage to SCR 90 through diode 63 causing SCR 90 to apply current to the disabling coil 76 momentarily opening contact 75 and disabling SCR 130 and therefor motor 24'. Similarly, if the target is pointed to the south of the sunlight, LASCR 37 will be rendered conductive to operate SCR 120 which applies operating power to LASCR 62 through diode 122 and operating power to coil 114 causing contacts 112 and 116 to move downwardly into the position opposite that shown in FIG. 5 to reverse the current applied to motor coil 24" which is applied thereto through SCR 130 rendered conductive by power being applied to its gate terminal through diode 123. The motor will continue to move the tracking device in a northerly direction until light is detected by LASCR 62 which, as before, renders SCR 90 conductive thereby momentarily opening contacts 75 through the actuation of coil 76. Motor winding 24" includes a pair of light emitting diodes 101 and 103 associated therewith and coupled across the motor windings through resistors 105 and 107 respectively which are activated to indicate to the operator the activation of the motor in a northerly or southerly direction.

Thus, it is seen that LASCR's 37 through 40 cause the activation of the solar tracking device while LASCR's 62 and 64 cause the deactivation of the tracking device. LASCR's 42 and 43 are employed for moving the device either from a westerly direction back to an easterly direction at sunrise or moving it to the westerly direction in the event the unit is not operative for a significant period of time during the day as may occur during a heavy cloud cover. This results since, for example, after a day's operation the unit will be rendered inoperative pointing toward the sunset. As the sun rises the next morning, light will not impinge upon LASCR 38 since it will be pointed generally upwardly but will impinge upon LASCR 42 coupled in parallel with LASCR 38. Thus, LASCR 42 will cause the activation of the solar tracking device to orient the target 50 toward the sun. Normally, the motion of the sun in a north-south direction will not be sufficiently significant to prevent the operation of LASCR's 37 and 39 in affecting the tracking of the sun by the device.

Thus, it is seen there is provided a sensor which provides an electrical control signal for the activation and deactivation of a solar tracking system. The sensor is directionally sensitive to the sun's direction and provides a very accurate and yet uncomplicated sensor for use in conjunction with a control circuit for controlling the tracking device. The control circuit provides a relatively low power system whereby when in its quiescent state, draws practically no power and when rendered operative to track the sun, it operates only momentarily until the sensor is realigned in the sun's direction. It will become apparent to those skilled in the art that various modifications to the preferred embodiment as described therein can be made without departing from the spirit or scope of the invention as defined by the appended claims.

The embodiments of the invention in which an exclusive property or privilege is claimed are defined as follows.

I claim:

1. A sensor for a light tracking device comprising:
   a mounting base;
   a plurality of light detectors mounted to said base in spaced relationship to one another;
   shade means mounted to said base for shading light directed toward said detectors; and
   target means positioned on said base between said light detectors, said target means including a pair of elongated recesses formed downwardly therein and extending in orthogonal relationship to one another, said target means including a recessed light detector mounted under each recess to receive light falling only within its associated recess.

2. The apparatus as defined in claim 1 wherein said mounting base has a curved wall and said plurality of light detectors comprises four light detectors spaced at 90° intervals on said wall of said mounting base.

3. The apparatus as defined in claim 2 wherein said shade means comprises an annular skirt.

4. A sensor for a light tracking device comprising:
   a mounting base having a curved wall;
   four light detectors mounted to said curved wall in spaced relationship to one another at 90° intervals;
   shade means comprising an annular skirt mounted to said base for shading light directed toward said detectors; and
   target means positioned on said base between said light detecotrs, said target means including a pair of recesses formed downwardly therein, said target means including a recessed light detector mounted under each recess to receive light falling within its associated recess, wherein said recesses formed in said target means are elongated and extend in orthogonal relationship to one another.

5. The apparatus as defined in claim 4 wherein each of said recessed light detectors are positioned in said recesses in spaced relationship to the center of said target means.

6. The apparatus as defined in claim 5 wherein said four light detectors have light responsive surfaces and are positioned on said base with said light responsive surfaces directed generally toward said shade means.

7. The apparatus as defined in claim 6 wherein said light detectors form an angle of about 45° to the plane of said shade means measured from an axis normal to the light responsive surfaces of said detectors.

8. The apparatus as defined in claim 7 wherein said shade means is made of a deformable material permitting adjustment of said shade means.

9. The system as defined in claim 8 and further including circuit means coupled to said light detectors and to said recessed light detectors for providing motor control signals for four directions of movement, said signals initiated upon detection of light by at least one of said light detectors and terminated upon detection of light by at least one of said recessed light detectors.

10. A sensor for a light tracking device comprising:
    a mounting base;
    a plurality of first light detectors positioned in spaced relationship to one another on said base, said first light detectors having light responsive surfaces facing directions lying within a conical locus of points from said base; and
    target means positioned on said base and including at least one light detector positioned within an elongated recess formed downwardly in said target means for providing a control signal when said target means aligns with a light source while moving in a direction orthogonal to the axis of said recess.

11. The apparatus as defined in claim 10 wherein said plurality of first light detectors comprises four detectors spaced at 90° intervals around said base.

12. The apparatus as defined in claim 11 wherein said target includes a pair of elongated recesses formed therein and extending in orthogonal relationship to one another and each of said recesses includes a light detector recessed therein.

13. The apparatus as defined in claim 12 and further including adjustable shade means positioned between said target and said first light detectors for selectively shading said first light detectors.

14. The system as defined in claim 13 and further including circuit means coupled to said light detectors and to said recessed light detectors for providing motor control signals for four directions of movement, said signals initiated upon detection of light by at least one of said light detectors and terminated upon detection of light by at least one of said recessed light detectors.

* * * * *

UNITED STATES PATENT AND TRADEMARK OFFICE
CERTIFICATE OF CORRECTION

PATENT NO. : 4,316,084
DATED : February 16, 1982
INVENTOR(S) : Alton H. Stout

It is certified that error appears in the above—identified patent and that said Letters Patent is hereby corrected as shown below:

Column 3, line 53:

"an" should be --and--.

Column 7, Claim 4, line 61:

"detecotrs" should be --detectors--.

Signed and Sealed this

Sixth Day of July 1982

[SEAL]

Attest:

*Attesting Officer*

GERALD J. MOSSINGHOFF
*Commissioner of Patents and Trademarks*